(12) United States Patent
Hasunuma

(10) Patent No.: US 7,777,142 B2
(45) Date of Patent: Aug. 17, 2010

(54) PRESSURE SWITCH

(75) Inventor: Masahiro Hasunuma, Gyoda (JP)

(73) Assignee: Surpass Industry Co. Ltd (JP)

( * ) Notice: Subject to any disclaimer, the term of this patent is extended or adjusted under 35 U.S.C. 154(b) by 237 days.

(21) Appl. No.: 11/915,209

(22) PCT Filed: May 24, 2006

(86) PCT No.: PCT/JP2006/310388

§ 371 (c)(1),
(2), (4) Date: Nov. 21, 2007

(87) PCT Pub. No.: WO2006/129541

PCT Pub. Date: Dec. 7, 2006

(65) Prior Publication Data

US 2009/0026059 A1    Jan. 29, 2009

(30) Foreign Application Priority Data

Jun. 1, 2005   (JP) ............................. 2005-161473

(51) Int. Cl.
*H01H 35/24* (2006.01)
(52) U.S. Cl. .................................. 200/81 R; 200/83 R
(58) Field of Classification Search ................ 200/81 R, 200/83 R, 83 A, 83 B, 83 Q, 83 V, 83 W
See application file for complete search history.

(56) References Cited

U.S. PATENT DOCUMENTS

| | | | | |
|---|---|---|---|---|
| 4,469,922 A * | 9/1984 | Fukuda et al. | ............ | 200/83 R |
| 4,644,116 A * | 2/1987 | Miyakawa | ................ | 200/83 R |
| 4,671,116 A * | 6/1987 | Glennon et al. | ............... | 73/728 |
| 5,272,294 A * | 12/1993 | Charboneau et al. | ...... | 200/83 R |
| 5,308,939 A * | 5/1994 | Sasaki | ....................... | 200/83 R |
| 5,315,878 A * | 5/1994 | Birenheide | ................... | 73/727 |
| 5,932,857 A * | 8/1999 | Stander et al. | ............. | 200/83 B |
| 6,346,681 B1 * | 2/2002 | Joyce et al. | ................. | 200/83 S |
| 6,867,383 B1 * | 3/2005 | Currier | ..................... | 200/83 R |
| 7,093,451 B2 * | 8/2006 | Mu et al. | ...................... | 62/149 |
| 7,298,280 B2 * | 11/2007 | Voege et al. | ................ | 340/606 |

FOREIGN PATENT DOCUMENTS

| | | | |
|---|---|---|---|
| JP | 2-113249 | U | 9/1990 |
| JP | 6-129927 | A | 5/1994 |
| JP | 7-72029 | A | 3/1995 |
| JP | 10-239190 | A | 9/1998 |
| JP | 2001-266721 | A | 9/2001 |

* cited by examiner

*Primary Examiner*—Michael A Friedhofer
(74) *Attorney, Agent, or Firm*—Thomas, Karceski, Raring & Teague, P.C.

(57) ABSTRACT

A compact pressure switch that causes little error in the operating point of the switch and that has resistance to dust, water, and chemical solutions is provided. The pressure switch includes a housing (2) formed of a resin having chemical solution resistance, a pressure sensor (3) that detects the pressure of a fluid, a separator (4) that is formed of a resin having chemical solution resistance and that prevents the fluid from coming into contact with the pressure sensor (3), and a circuit unit (5) that outputs on and off signals based on the output of the pressure sensor (3). At least the pressure sensor (3) and the circuit unit (5) are disposed in a sealed space (S) formed by the housing (2) and the separator (4).

6 Claims, 4 Drawing Sheets

PRESSURE SWITCH

TECHNICAL FIELD

The present invention relates to pressure switches for detecting fluid pressure.

BACKGROUND ART

Conventionally, pressure switches that output, for example, on and off signals based on fluid pressure have been widely used. Such pressure switches include those installed and used at sites where the pressure of a fluid containing a corrosive chemical, such as high-purity nitric acid, hydrochloric acid, or hydrofluoric acid, is measured, as in, for example, semiconductor manufacturing processes. As a concrete example, a semiconductor manufacturing apparatus uses a chemical solution containing hydrofluoric acid for etching semiconductor substrates. To stably supply the chemical solution, a pressure switch is installed in a circulation circuit for the chemical solution.

Because the above chemical solution is highly corrosive, a pressure switch having superior chemical resistance (chemical solution resistance) is required for installation in such a corrosive environment. Hence, the above semiconductor manufacturing apparatus uses a pressure switch in which a member formed of a resin having chemical resistance is disposed at a site where the switch comes into contact with the chemical solution.

The pressure switch can output on and off signals, for example, by a known mechanical switching method using a spring (for example, see Patent Document 1).

Patent Document 1: Japanese Unexamined Patent Application, Publication No. 2001-266721

DISCLOSURE OF INVENTION

Patent Document 1 above discloses a pressure switch including a diaphragm that moves in response to the measured pressure, a toggle spring mechanism that toggles in association with the movement of the diaphragm, and a microswitch that outputs on and off signals in association with the operation of the toggle spring mechanism.

Unfortunately, the method using a spring, such as the toggle spring mechanism described above, for pressure detection and conversion to on and off signals has the problem that there is a significant error in the operating point of the switch.

Specifically, such a method has the problem that even springs manufactured under the same standard cause variations in the pressure at which on or off signals are output because the characteristics of the individual springs vary within the range of the standard.

In addition, a spring has the problem that it causes variations in the pressure at which on or off signals are output because it has low repeatability. Another problem arises in sliding wear of a moving part such as a spring, which varies the pressure at which on or off signals are output the longer it is operated.

A further problem is that a compact pressure switch including a spring is difficult to design because the switch requires a sufficient space for the operating distance of the spring.

An object of the present invention, which has been made to solve the above problems, is to provide a compact pressure switch that causes little error in the operating point of the switch and that has resistance to dust, water, and chemical solutions.

To achieve the above object, the present invention provides the following solutions.

A pressure switch of the present invention includes a housing formed of a resin having chemical solution resistance, a pressure sensor that detects the pressure of a fluid, a separator that is formed of a resin having chemical solution resistance and that prevents the fluid from coming into contact with the pressure sensor, and a circuit unit that outputs on and off signals based on the output of the pressure sensor. At least the pressure sensor and the circuit unit are disposed in a sealed space formed by the housing and the separator.

According to the present invention, on and off signals can be electrically output using the pressure sensor and the circuit unit. It is therefore possible to suppress variations in the pressure at which on and off signals are output in comparison with pressure switches including springs, as described above.

Specifically, it is possible to suppress variations in the pressure at which on and off signals are output because the pressure sensor and the circuit unit have smaller variations in characteristics than the springs described above. In addition, it is possible to suppress variations in the pressure at which on and off signals are output because the pressure sensor has a higher repeatability than springs.

Because at least the pressure sensor and the circuit unit (hereinafter referred to as the pressure sensor and so on) are disposed inside the sealed space, they are isolated from the fluid, dust, etc. It is therefore possible to prevent a failure of the pressure sensor and so on due to the fluid, dust, etc.

Even if the fluid is a chemical solution, it is possible to prevent a failure of the pressure sensor and so on due to the chemical solution because the housing and the separator, which form the sealed space, are formed of a material having chemical solution resistance.

The pressure switch can be reduced in size because the pressure sensor and so on include no moving parts and therefore require no operating space therefor. In addition, the size of the pressure switch can be reduced because the size of the pressure sensor can be reduced more easily than the size of a spring, as described above.

In the present invention, the pressure switch preferably further includes a light source that is disposed in the sealed space and that is turned on and off based on the output of the pressure sensor.

Because the light source that is turned on and off based on the output of the pressure sensor is provided, the pressure of the fluid can be determined by visually checking the on/off state of the light source. The pressure of the fluid can therefore be determined without using, for example, a monitor.

In addition, the operation of the pressure switch can readily be checked without using, for example, a monitor by visually checking whether the light source is turned on or off.

If the light source is disposed inside the sealed space, it can be isolated from the fluid, dust, etc. to prevent a failure of the light source due to the fluid, dust, etc. At the same time, it is possible to prevent a failure of the light source due to chemical solutions.

According to the pressure switch of the present invention, on and off signals can be electrically output using the pressure sensor and the circuit unit. This provides the effect of suppressing variations in the pressure at which on and off signals are output to reduce errors in the operating point of the switch.

Because at least the pressure sensor and the circuit unit are disposed inside the sealed space, it is possible to prevent a failure of the pressure sensor and so on due to the fluid (chemical solution), dust, etc. This provides the effect of imparting dust resistance, water resistance, and chemical solution resistance to the pressure switch.

The pressure sensor and the circuit unit include no moving parts and therefore require no operating space therefor. This provides the effect of reducing the size of the pressure switch.

BEST MODE FOR CARRYING OUT THE INVENTION

A pressure switch according to an embodiment of the present invention will now be described with reference to FIGS. 1 to 4.

Figure 1:
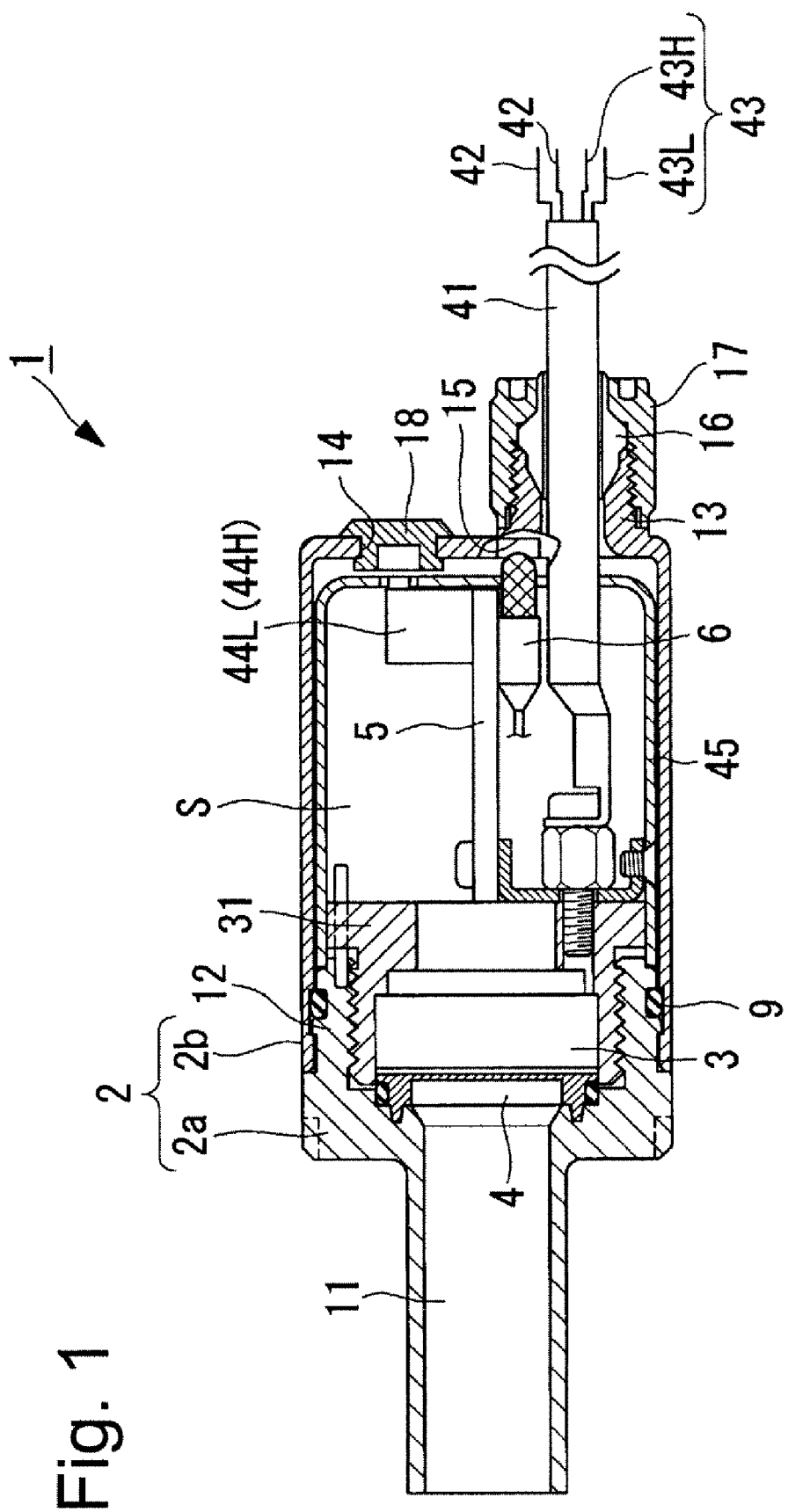
FIG. 1 is a schematic sectional view of a pressure switch according to the present invention.
Figure 2:
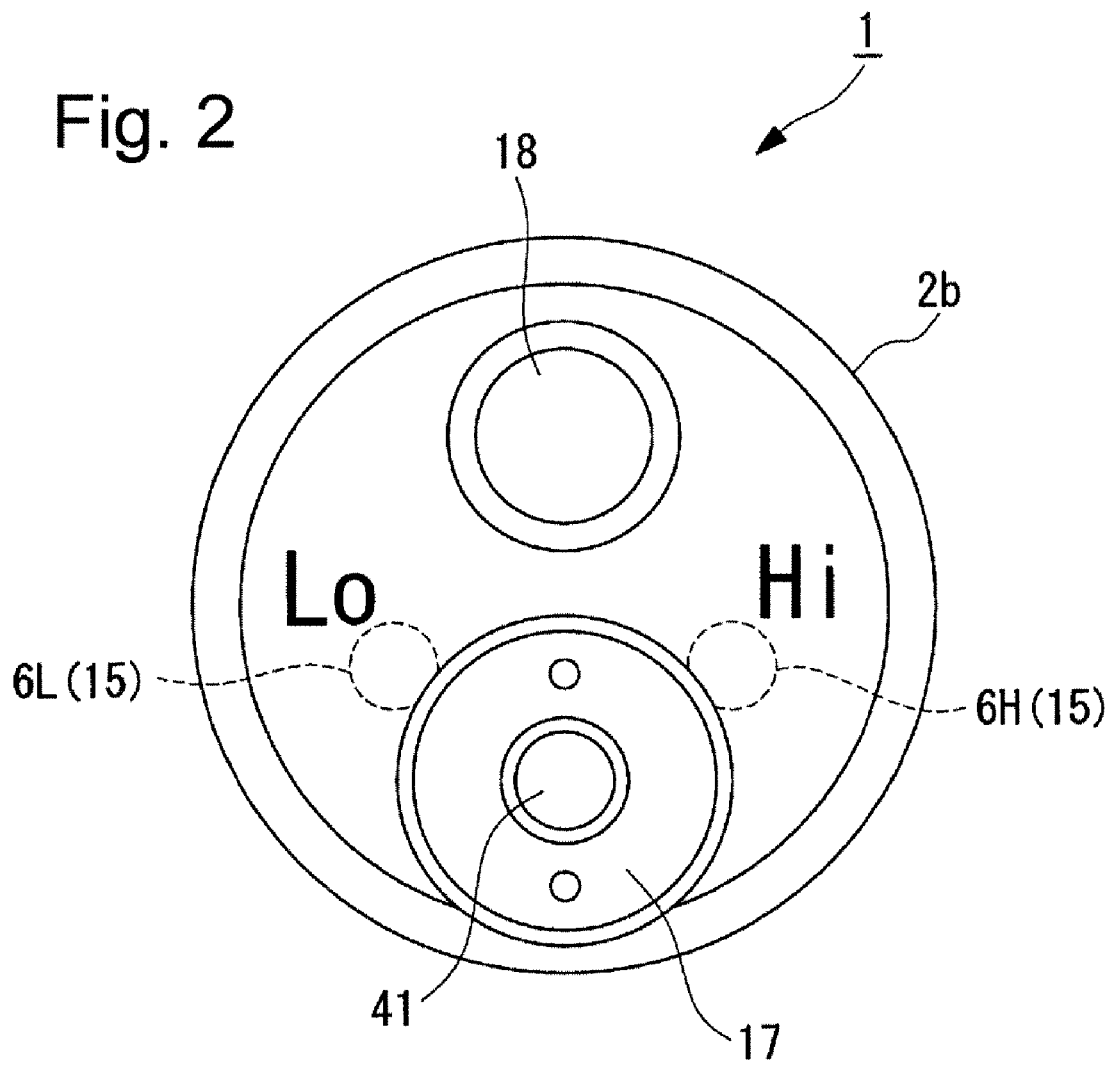
FIG. 2 is a side view of the pressure switch shown in FIG. 1.

FIG. 1 is a schematic sectional view of the pressure switch according to the present invention. FIG. 2 is a side view of the pressure switch shown in FIG. 1.

In FIGS. 1 and 2, a pressure switch 1 mainly includes a substantially cylindrical casing (housing) 2, a pressure sensor 3 that detects the pressure of a chemical solution, a diaphragm (separator) 4 that prevents the chemical solution from coming into contact with the pressure sensor 3, a circuit unit 5 that outputs on and off signals based on the output of the pressure sensor 3, and light sources 6 that turn on and off based on the output of the pressure sensor 3.

The casing 2 includes a body 2a on which the pressure sensor 3 and so on are disposed and a cover 2b covering the pressure sensor 3 and so on disposed thereon. The body 2a and the cover 2b form an inner sealed space S. The body 2a and the cover 2b are preferably formed of, for example, a tetrafluoroethylene (PTFE) resin such as Teflon (registered trademark), but can also be formed of a perfluoroalkoxyalkane (PFA) resin.

Various materials can be used for the body 2a and the cover 2b; PTFE resins are most preferable in terms of chemical resistance.

That is, fluorocarbon resins are preferred in terms of chemical resistance because they are chemically inert materials. Among fluorocarbon resins, PTFE resins are most preferable in terms of gas permeation, an inevitable problem for resin materials, because these resins have high crystallinity and contain few voids. Among PTFE resins, modified PTFE resins are optimum materials because they have particularly high crystallinity and contain few voids.

The body 2a includes an inflow portion 11 into which the chemical solution flows and an attachment portion 12 to which the cover 2b and the pressure sensor 3, for example, are attached. The attachment portion 12 is formed in a substantially cylindrical shape. The cover 2b is attached to an outer circumferential surface of the attachment portion 12. A sensor holder 31, described later, is screw-fitted to an inner circumferential surface of the attachment portion 12.

A wiring hole 13 for a cable, described later, and a setting hole 14 for trimmers, described later, are formed in the bottom surface of the cover 2b, and recesses 15 are formed at positions opposite the light sources 6. Because the recesses 15 are formed, the cover 2b is thinner, and it can thus easily transmit light emitted from the light sources 6 to the outside. The light from the light sources 6 can therefore be viewed more readily.

A grommet 16 and a nut 17 are disposed at the wiring hole 13. Fastening the nut 17 brings the grommet 16 into close contact with the cable, the wiring hole 13, and the nut 17 to ensure a hermetic seal from the outside. A cap 18 is fitted to the setting hole 14 to ensure a hermetic seal from the outside.

An O-ring 19 is disposed between the fitted portions of the body 2a and the cover 2b to ensure a hermetic seal from the outside.

Figure 3:
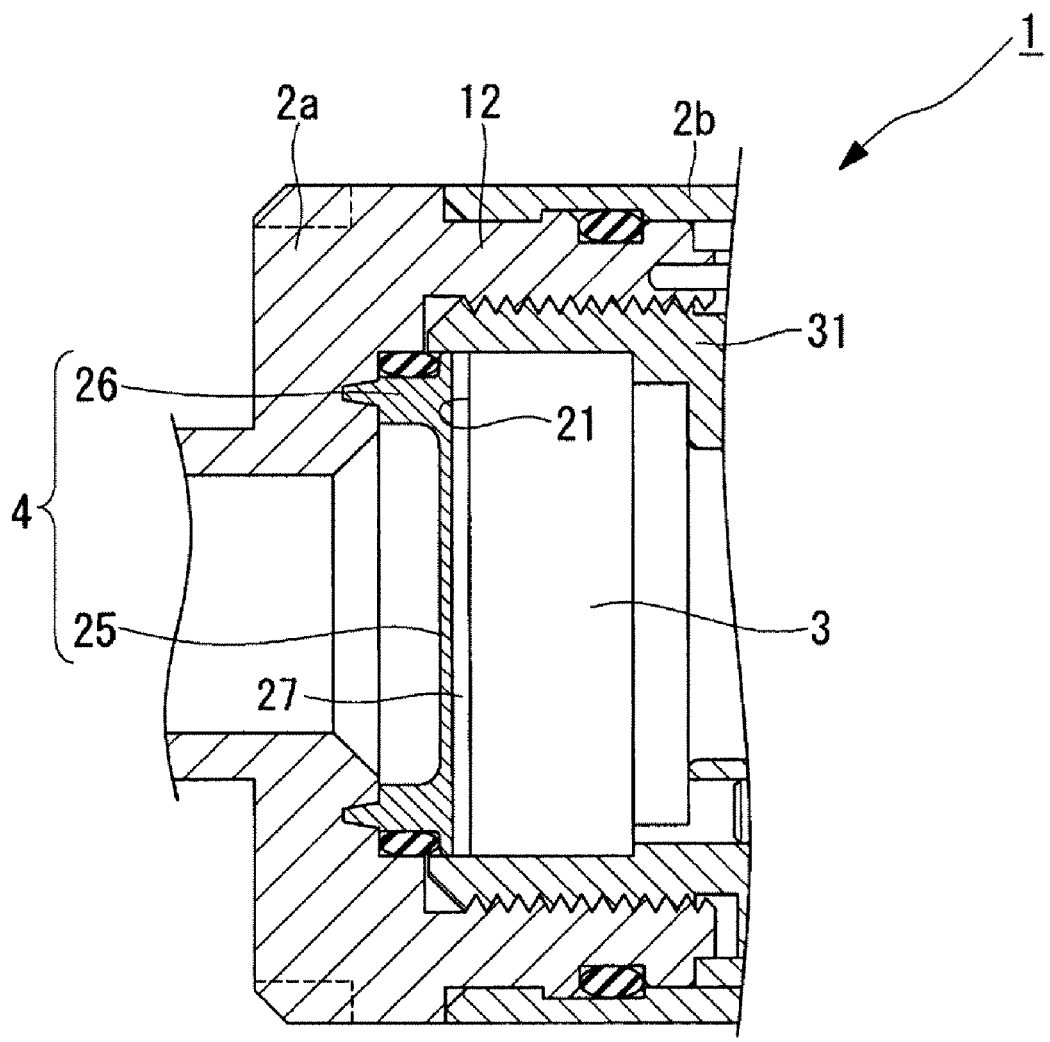
FIG. 3 is an enlarged sectional view of a pressure sensor and a flange of the pressure switch of FIG. 1.

FIG. 3 is an enlarged sectional view of the pressure sensor 3 and the flange 4 of the pressure switch shown in FIG. 1.

In FIGS. 1 to 3, the pressure sensor 3 is formed of ceramic or metal and has a cylindrical shape with two closed sides. A thin plate-like pressure-receiving surface 21 is provided on one side thereof. The pressure-receiving surface 21 undergoes elastic deformation when exposed to fluid pressure. The pressure-receiving surface 21 has a circuit device, such as a Wheatstone bridge, that converts the deformation of the pressure-receiving surface 21 to an electrical signal and feeds it to the circuit unit 5.

The diaphragm 4 mainly includes a substantially central sheet portion 25 and an annular sealing portion 26 formed so as to protrude from around the sheet portion 25. The diaphragm 4 is preferably formed of, for example, a tetrafluoroethylene (PTFE) resin such as Teflon (registered trademark), but can also be formed of a perfluoroalkoxyalkane (PFA) resin.

A meltable resin layer (bonding layer) 27 is disposed between the pressure-receiving surface 21 of the pressure sensor 3 and the diaphragm 4. The meltable resin layer 27 can easily be formed with a uniform thickness. The diaphragm 4 is bonded to the pressure sensor 3 by melting the meltable resin layer 27.

For example, a fluorinated ethylene-propylene (FEP) resin sheet is preferred as the material of the meltable resin layer 27, although other sheet-like melting resin materials can also be used, including poly(vinylidene fluoride) (PVDF) resins, ethylene-tetrafluoroethylene (ETFE) copolymer resins, polyethylene (PE) resins, perfluoroalkoxyalkane (PFA) resins, and poly(vinyl fluoride) (PVF) resins.

To bond the diaphragm 4, a sheet-like melting resin material for forming the meltable resin layer 27 is held between the pressure-receiving surface 21 and the diaphragm 4 and is melted at high temperature. This results in the formation of the meltable resin layer 27, with the diaphragm 4 bonded to the pressure-receiving surface 21.

The problem of gas permeation need not be considered because no adhesive is applied to the bonded surface of the diaphragm 4.

Figure 4:
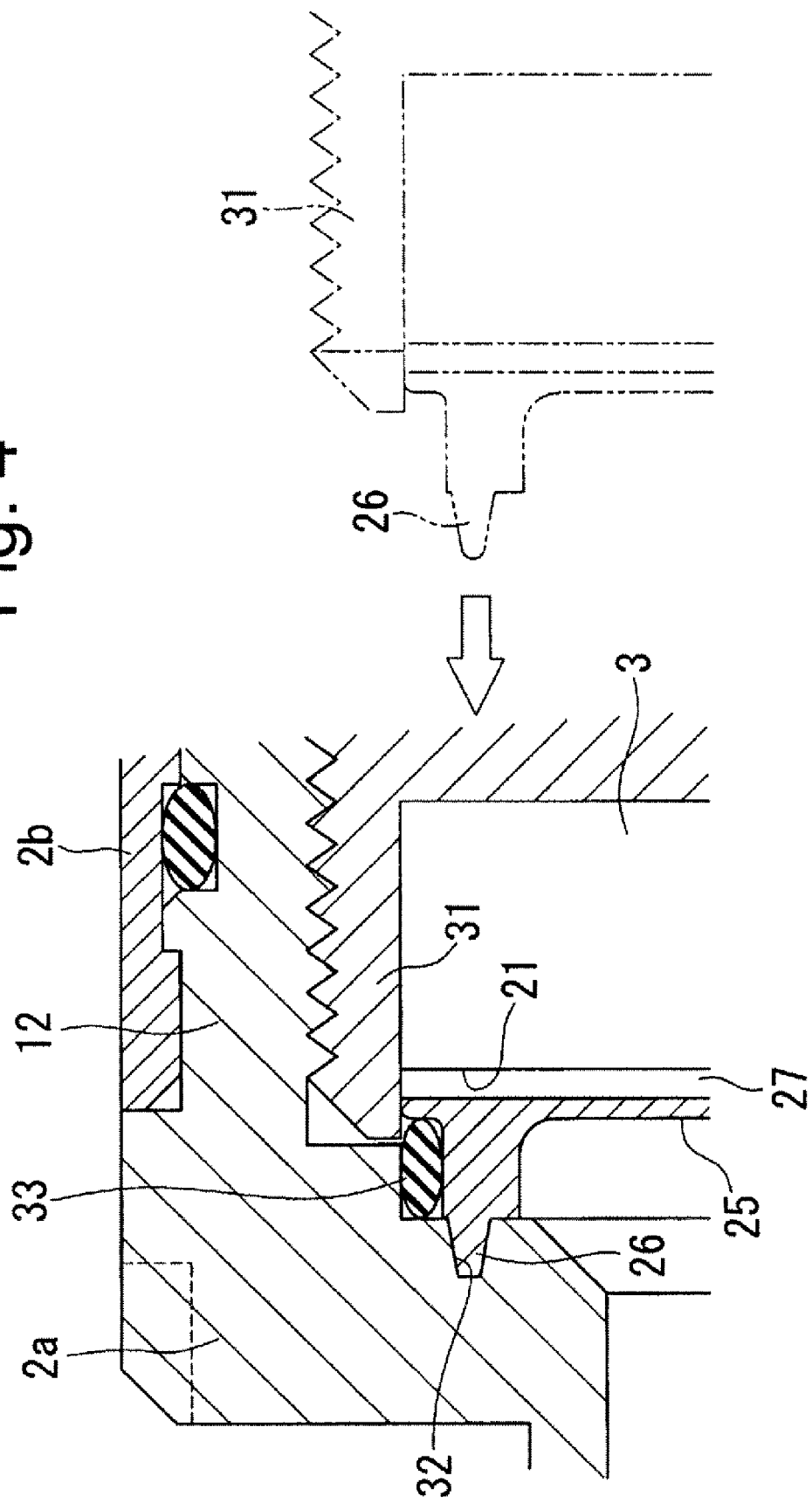
FIG. 4 is an enlarged sectional view of a region around a sealing portion of FIG. 3.

FIG. 4 is an enlarged sectional view of a region around the sealing portion shown in FIG. 3.

The sensor holder 31, disposed inside the attachment portion 12 of the body 2a, is formed in a substantially cylindrical shape, as shown in FIG. 1, and has a threaded portion formed on an outer circumferential surface thereof and screwed into the attachment portion 12 and a step formed on an inner circumferential surface thereof to support the pressure sensor 3.

In FIG. 4, the sealing portion 26 of the diaphragm 4 can be pressed against the body 2a by screwing the sensor holder 31 into the attachment portion 12 with the pressure sensor 3 held inside. A groove 32 is formed in a surface of the body 2a opposite the sealing portion 26. The sealing portion 26 is squeezed into the groove 32 and is crushed so that it comes into close contact with the surrounding wall surfaces. This prevents the chemical solution from intruding into the pressure switch 1 through the sealing portion 26.

An O-ring 33 is disposed between the outer circumferential surface of the sealing portion 26 and the body 2a to provide a double seal, although there is little possibility that the O-ring 33 deteriorates through contact with the chemical solution because the sealing portion 26, which provides the first-stage seal, comes into close contact with the three surfaces of the groove 32 to provide a substantially perfect seal.

In FIG. 1, the circuit unit 5 is attached to the sensor holder 31. The circuit unit 5 is electrically connected to the circuit device of the pressure sensor 3 and is configured so that the signal from the pressure sensor 3 is input thereto. In addition, a cable 41 electrically connected to an external apparatus is attached to the sensor holder 31. The cable 41 accommodates a pair of wiring lines 42 for supplying power to the circuit unit 5 and the pressure sensor 3 and a pair of signal lines 43 through which the circuit unit 5 outputs signals. The wiring lines 42 and the signal lines 43 are electrically connected to the circuit unit 5.

The circuit unit 5 is provided with signal lines 43H and 43L. The signal line 43H outputs an on/off signal based on the output of the pressure sensor 3 and a predetermined upper-limit pressure Hi. The signal line 43L outputs an on/off signal based on the output of the pressure sensor 3 and a predetermined lower-limit pressure Lo.

The circuit unit 5 is also provided with light sources 6H and 6L. The light source 6H turns on and off in synchronization with the on/off signal output from the signal line 43H (see FIG. 2). The light source 6L turns on and off in synchronization with the on/off signal output from the signal line 43L. The light sources 6H and 6L used can be, for example, light-emitting diodes (LEDs).

The circuit unit 5 is also provided with trimmers 44H and 44L. The trimmer 44H is used to calibrate the predetermined upper-limit pressure Hi for the on/off signal output from the signal line 43H. The trimmer 44L is used to calibrate the predetermined lower-limit pressure Lo for the on/off signal output from the signal line 43L. In FIG. 1, the trimmers 44H and 44L are arranged side by side perpendicularly to the page, with the trimmer 44H hidden behind the trimmer 44L.

A shield case 45 formed of a metal such as stainless steel (SUS304) is disposed inside the cover 2b. The shield case 45 is disposed so as to cover the circuit unit 5, the trimmers 44H and 4L, and the light sources 6H and 6L.

The shield case 45 can block electromagnetic waves radiating from or entering the pressure switch 1. The shield case 45 can therefore prevent, for example, malfunction of other electronic devices due to the electromagnetic waves radiated from the pressure switch 1 and can also prevent generation of noise in the signals output from the pressure switch 1.

The body 2a and the diaphragm 4 can be separately formed, as described above, or can be integrally formed. This reduces the number of components used.

Next, pressure measurement using the pressure switch 1 having the structure described above will be described.

The predetermined upper-limit pressure Hi and the predetermined lower-limit pressure Lo are calibrated before the pressure measurement using the pressure switch 1.

First, the trimmer 44L is used to calibrate the predetermined lower-limit pressure Lo such that the signals output from the signal line 43L are switched from on to off while a pressure equal to the predetermined lower-limit pressure Lo is being applied to the pressure-receiving surface 21 of the pressure sensor 3. Then, in a similar fashion, the trimmer 44H is used to calibrate the predetermined upper-limit pressure Hi such that the signals output from the signal line 43H are switched from off to on while a pressure equal to the predetermined upper-limit pressure Hi is being applied to the pressure-receiving surface 21 of the pressure sensor 3.

The pressure switch 1 thus calibrated is installed in, for example, a chemical solution line of a semiconductor manufacturing apparatus. The signal lines 43H and 43L of the pressure switch 1 are connected to a control unit of the semiconductor manufacturing apparatus to feed an on/off signal to the control unit based on the pressure of a chemical solution.

Specifically, the chemical solution flows into the inflow portion 11, and its pressure pushes the pressure-receiving surface 21 of the pressure sensor 3 with the diaphragm 4 disposed therebetween. The pressure sensor 3 then feeds the output corresponding to the pressure of the chemical solution to the circuit unit 5.

According to the input pressure of the chemical solution, the circuit unit 5 outputs an on/off signal and controls the on/off of the light sources 6H and 6L in the following three patterns:

(1) If the Pressure of the Chemical Solution is Lower than the Predetermined Lower-Limit Pressure Lo The signal line 43L outputs an on signal while the signal line 43H outputs an off signal. At the same time, the light source 6L is turned on while the light source 6H is turned off.

(2) If the Pressure of the Chemical Solution is Higher than the Predetermined Lower-Limit Pressure Lo and is Lower than the Predetermined Upper-Limit Pressure Hi The signal lines 43L and 43H output off signals. At the same time, the light sources 6L and 6H are turned off.

(3) If the Pressure of the Chemical Solution is Higher than the Predetermined Upper-Limit Pressure Hi The signal line 43L outputs an off signal while the signal line 43H outputs an on signal. At the same time, the light source 6L is turned off while the light source 6H is turned on.

While the above output pattern of on and off signals and on/off pattern of the light sources 6H and 6L may be employed, the following output pattern of on and off signals and on/off pattern of the light sources 6H and 6L may also be employed:

(A) If the Pressure of the Chemical Solution is Lower than the Predetermined Lower-Limit Pressure Lo The signal line 43L outputs an off signal while the signal line 43H outputs an on signal. At the same time, the light source 6L is turned off while the light source 6H is turned on.

(B) If the Pressure of the Chemical Solution is Higher than the Predetermined Lower-Limit Pressure Lo and is Lower than the Predetermined Upper-Limit Pressure Hi The signal lines 43L and 43H output on signals. At the same time, the light sources 6L and 6H are turned on.

(C) If the Pressure of the Chemical Solution is Higher than the Predetermined Upper-Limit Pressure Hi The signal line 43L outputs an on signal while the signal line 43H outputs an off signal. At the same time, the light source 6L is turned on while the light source 6H is turned off.

The above output pattern and on/off pattern can be used to readily detect a failure of the pressure switch 1 because one or both of the light sources 6H and 6L must always be turned on while the pressure switch 1 is operating normally. A failure can be determined if the light sources 6H and 6L are both turned off.

According to the above structure, it is possible to suppress variations in the pressure at which on and off signals are output because the pressure sensor 3 and the circuit unit 5 have smaller variations in characteristics than springs. In addition, it is possible to suppress variations in the pressure at which on and off signals are output because the pressure sensor 3 has a higher repeatability than springs.

Because at least the pressure sensor 3 and the circuit unit 5 are disposed inside the sealed space S, they can be isolated from the fluid, dust, etc. It is therefore possible to prevent a failure of the pressure sensor 3, the circuit unit 5, and so on due to the fluid, dust, etc., thus ensuring the resistance of the pressure switch 1 to dust and water.

One known standard for resistance to dust and water is a protection level classification represented by IP codes (see JIS C 0920). An IP code consists of code letters (IP), a first characteristic numeral, a second characteristic numeral, an additional characteristic letter, and a supplementary letter symbol. The first characteristic numeral indicates the level of protection provided against foreign solid objects. The second characteristic numeral indicates the level of protection provided against the ingress of water. The additional characteristic letter and the supplementary letter symbol are optional and may be omitted if unnecessary.

In terms of its IP code, it has been confirmed that the pressure switch 1 having the structure of the present invention satisfies IP65, meaning that the pressure switch 1 prevents the ingress of dust and also prevents the ingress of water when exposed to water jets.

It is possible to prevent a failure of the pressure sensor 3, the circuit unit 5, and so on due to the chemical solution because the body 2a, the cover 2b, and the diaphragm 4 are formed of a material having chemical resistance.

The pressure switch can be reduced in size because the pressure sensor 3, the circuit unit 5, and so on include no moving parts and therefore require no operating space therefor. In addition, the size of the pressure switch 1 can be reduced because the size of the pressure sensor 3 can be reduced more easily than the size of a spring.

The pressure of the chemical solution can be determined by visually checking the on/off state of the light sources 6H and 6L because they are turned on and off based on the output of the pressure sensor 3. The pressure of the chemical solution can therefore be determined without using, for example, a monitor.

In addition, the operation of the pressure switch 1 can readily be checked without using, for example, a monitor by visually checking whether the light sources 6H and 6L are turned on or off.

The technical scope of the present invention is not limited to the above embodiment; various modifications are permitted without departing from the spirit of the present invention.

For example, although the invention is applied to a pressure switch for use in a semiconductor manufacturing apparatus in the embodiment described above, the invention is not limited to a pressure switch for use in a semiconductor manufacturing apparatus, but can also be applied to pressure switches of various other apparatuses including chemical solution lines.

The invention claimed is:

1. A pressure switch comprising:
   a housing formed of a resin having chemical solution resistance;
   a pressure sensor that detects the pressure of a fluid;
   a separator that is formed of a resin having chemical solution resistance and that prevents the fluid from coming into contact with the pressure sensor; and
   a circuit unit that outputs on and off signals based on the output of the pressure sensor;
   wherein at least the pressure sensor and the circuit unit are disposed in a sealed space formed by the housing and the separator.

2. The pressure switch according to claim 1, further comprising a light source disposed in the sealed space, the light source being turned on and off based on the output of the pressure sensor.

3. The pressure switch according to claim 1, wherein the circuit unit outputs the on and off signals with respect to each of at least two predetermined pressure values on the basis of the output of the pressure sensor.

4. The pressure switch according to claim 1, wherein the housing and separator are formed of a fluororesin selected from the group consisting of tetrafluoroethylene resin and perfluoroalkoxyalkane resin.

5. A pressure switch comprising:
   a housing formed of a resin having chemical solution resistance;
   a means for detecting the pressure of a fluid;
   a separator that is formed of a resin having chemical solution resistance and that prevents the fluid from coming into contact with the pressure sensor; and
   a circuit unit that outputs on and off signals based on the output of the pressure sensor;
   wherein at least the pressure sensor and the circuit unit are disposed in a sealed space formed by the housing and the separator.

6. The pressure switch according to claim 5, wherein the circuit unit outputs the on and off signals with respect to each of at least two predetermined pressure values on the basis of the output of the pressure sensor.

* * * * *